(12) United States Patent
Schmied

(10) Patent No.: US 7,096,593 B2
(45) Date of Patent: Aug. 29, 2006

(54) ANGLE-MEASUREMENT DEVICE

(75) Inventor: Benno Schmied, Ludwigshafen (DE)

(73) Assignee: Carl Freudenberg KG, (DE)

( * ) Notice: Subject to any disclaimer, the term of this patent is extended or adjusted under 35 U.S.C. 154(b) by 0 days.

(21) Appl. No.: 11/063,243

(22) Filed: Feb. 22, 2005

(65) Prior Publication Data

US 2005/0193583 A1 Sep. 8, 2005

(30) Foreign Application Priority Data

Mar. 3, 2004 (DE) ...................... 10 2004 010 948

(51) Int. Cl.
*G01B 7/30* (2006.01)
(52) U.S. Cl. ..................... 33/605; 33/1 N; 33/1 PT; 33/706; 324/207.23; 324/207.25
(58) Field of Classification Search ............... 33/605, 33/1 PT, 1 N, 706, 707, 708; 324/207.11–207.25
See application file for complete search history.

(56) References Cited

U.S. PATENT DOCUMENTS

| | | | | |
|---|---|---|---|---|
| 2,867,783 A | * | 1/1959 | Childs | ........................ 336/123 |
| 3,993,946 A | * | 11/1976 | Makino | .................. 324/207.21 |
| 4,449,191 A | * | 5/1984 | Mehnert | ....................... 702/94 |
| 4,764,767 A | * | 8/1988 | Ichikawa et al. | ...... 340/870.31 |
| 5,019,776 A | * | 5/1991 | Kawamata et al. | .... 324/207.12 |
| 5,200,698 A | * | 4/1993 | Thibaud | ................. 324/207.22 |
| 5,570,016 A | * | 10/1996 | Schroeder et al. | ..... 324/207.25 |
| 5,648,851 A | * | 7/1997 | Kellner | ....................... 356/616 |
| 6,552,534 B1 | * | 4/2003 | Desbiolles et al. | .... 324/207.25 |
| 6,559,638 B1 | * | 5/2003 | Adelerhof | .............. 324/207.21 |
| 6,796,036 B1 | * | 9/2004 | Klarer | ......................... 33/203 |
| 6,964,102 B1 | * | 11/2005 | Schroder | .................... 33/1 PT |
| 2005/0194968 A1 | * | 9/2005 | Schmied | ................ 324/207.25 |
| 2006/0022665 A1 | * | 2/2006 | Lutaud et al. | .............. 324/174 |

FOREIGN PATENT DOCUMENTS

| | | | |
|---|---|---|---|
| DE | 10038296 A1 | * | 2/2002 |
| GB | 2205406 A | * | 12/1988 |

* cited by examiner

*Primary Examiner*—Diego Gutierrez
*Assistant Examiner*—Amy R. Cohen
(74) *Attorney, Agent, or Firm*—Harness, Dickey & Pierce, P.L.C.

(57) ABSTRACT

An angle-measurement device comprising a carrier element with at least two tracers. At least one tracer is configured as an annular surface, and at least one tracer is configured as a cylindrical surface. Each tracer has essentially coinciding periodic patterns that are electromagnetically or optically detectable by at least one sensor, and one tracer has a number N of patterns and the other tracer has a number N+1 of patterns. In another embodiment, one tracer is disposed on one face and the other tracer is disposed on another face of an annular carrier element.

12 Claims, 4 Drawing Sheets

ANGLE-MEASUREMENT DEVICE

CROSS-REFERENCE TO RELATED APPLICATIONS

This application claims the benefit of German Patent Application 10 2004 010 948.6, filed Mar. 3, 2004. The disclosure of the above application is incorporated herein by reference.

FIELD OF THE INVENTION

The present invention relates to an angle-measurement device.

BACKGROUND OF THE INVENTION

Angle-measurement devices for absolute measurement over a full circle of 360° are known from DE 100 38 296. The prior-art angle-measurement device includes an arrangement of several annular tracers on one face of a rotatable, disk-shaped carrier element. The tracers are provided with magnetically detectable periodic patterns that act in an axial direction. The periodicity of the patterns differs by one in accordance with the Vernier principle. In the vicinity of the carrier element are disposed magnetic detection heads that produce a periodic detection signal.

U.S. Pat. No. 4,764,767 describes an absolute angle-measurement device with two cylindrical tracers wherein the axially extended tracers are disposed in parallel on the surface of a cylinder and act in a radial direction.

The prior-art angle-measurement devices, however, have a drawback in that their space requirements are very large. As such, if several annular tracers are to be disposed on a face of an annular carrier element, the disk must have a larger diameter if several annular tracers are to be disposed simultaneously, and provide good resolution, on the front face of a carrier element. Furthermore, when several cylinder-shaped tracers are disposed on a cylindrical carrier element, the axial extension of the angle-measurement device is large.

SUMMARY OF THE INVENTION

An object of the present invention is to provide an absolute angle-measurement device having low space requirements.

To this end, the angle-measurement device of the present invention has a carrier element with at least two tracers. At least one tracer is in the form of an annular surface, and at least one tracer is in the form of a cylindrical surface. Moreover, each tracer has essentially coinciding periodic patterns that are detectable electromagnetically or optically by at least one sensor, wherein one tracer has N patterns and the other tracer has N+1 patterns.

Distribution of the tracers on an annular surface and on a cylindrical surface produces an axial and radial extension of the carrier element, and thus of the angle-measurement device, that is small and results in a compact configuration. The minimum axial extension of the carrier element is equal to only one tracer width.

According to another embodiment of the invention, the angle-measurement device has at least two tracers. One of the tracers is disposed on one face and the other tracer on another face of an annular carrier element.

By disposing one tracer on one face and one tracer on another face of an annular carrier element, the axial and radial extensions of the carrier element and, hence, of the angle-measurement device are also small. The axial extension of the carrier element is independent of the number of tracers, because only the tracers that act in the axial direction are used. The radial extension of the angle-measurement device depends on the selected diameter of only one tracer, and the diameter of the tracer determines the resolution of the angle-measurement device.

Because of the highly compact configuration of the angle-measurement device according to the present invention, the device can be integrated into other structural elements such as, for example, cassette seals which have only very limited space available for angle-measurement devices.

In another embodiment, the carrier element can be formed by the collar of a shaft. A shaft collar is simple to fabricate and cannot change its position during operation. This prevents erroneous measuring signals from the tracers that are connected with the carrier element in a rotation-resisting manner.

The two faces of the carrier element can be radially connected on the outer circumferential side surface by a cylindrical surface extending in an axial direction, and on the surface there can be disposed at least one additional tracer. In this manner, at least three tracers with very small space requirements can be integrated on the carrier element. The additional tracer makes it possible, for example, to achieve a finer resolution of the angular position of the machine element to be measured.

The carrier element can be made as a sheet-metal part. Sheet-metal parts are inexpensive and can be produced economically in large numbers. A carrier element made of sheet metal weighs little.

Patterns in the form of recesses can be made in the sheet-metal part. In this manner, the production of tracers with detectable patterns consisting of recesses is simple and economical. Space requirements are low. Moreover, the fabrication cost of passively acting patterns in the form of recesses is low.

The detectable patterns can be formed from a magnetizable material. Magnetizable materials permit the formation of actively acting tracers that provide good resolution and allow greater sensor distances than do passively acting patterns. Tracers consisting of magnetizable material have no protruding elements so that the surface does not tend to soil.

The tracers can also be made of a ferrite-filled plastic material. Ferrite-filled plastics are resistant to water, oils and fats. Moreover, tracers made of a ferrite-filled plastic material are elastic and thus are not sensitive to the thermal expansion of the carrier element.

Preferably, the single position of the angle-measurement device with a common transition of the patterns of the two tracers can be assigned to the upper dead center (UDC) of a crankshaft of a motor vehicle engine. By such an assignment, the position of the UDC for any rotational angle can be recognized from the phase difference of the two tracers. The position with a phase difference equal to zero corresponds to the UDC. No special UDC marking is necessary, and the UDC position can be determined at any time from the phase difference of the tracers.

In yet another embodiment, at least one of the sensors can be functioning with a passive measuring principle. Passive sensors that function on, for example, the inductive measuring principle are economical.

In another embodiment, at least one of the sensors can be functioning on the active measuring principle. Active sensors such as, for example, Hall sensors produce a measuring signal even at very low rotational speeds. These sensors are more compact than the sensors that function on the passive measuring principle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

A few exemplary embodiments of the angle-measurement device of the invention will now be explained more closely by reference to FIGS. 1 to 4 which in schematic representation show the following.

DETAILED DESCRIPTION OF THE PREFERRED EMBODIMENTS

The following description of the preferred embodiment(s) is merely exemplary in nature and is in no way intended to limit the invention, its application, or uses.

Figure 1:
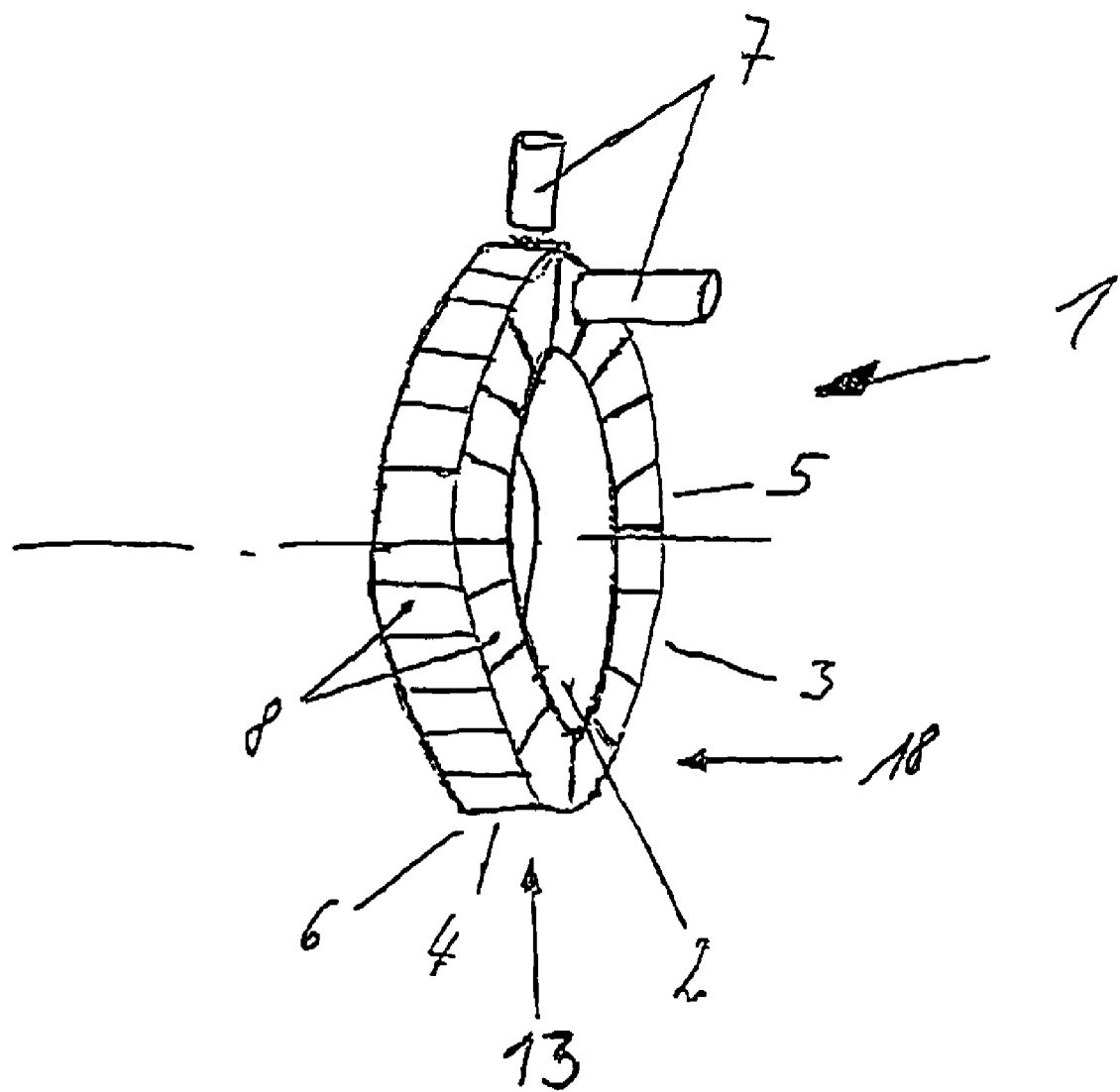
FIG. 1 shows an angle-measurement device with a radially and an axially disposed tracer according to a principle of the present invention.

FIG. 1 shows an angle-measurement device 1 consisting of a carrier element 2. On the front face 18 of the carrier element 2 is disposed, as an annular face 5, a tracer 3 that acts in an axial direction. On the cylindrical surface 13 of the carrier element 2 is located an additional tracer 4 that is in the form of a cylindrical surface 6. The two tracers 3 and 4 are provided with coinciding and uniformly distributed, electromagnetically detectable patterns 8. The number of patterns 8 on the two tracers 3 and 4 differs by one. The tracers 3 and 4 consist of a ferrite-filled plastic material which is cured onto the carrier element 2. The patterns 8 are impressed into the tracers 3 and 4 by magnetization and are detected by sensors 7.

Figure 2:
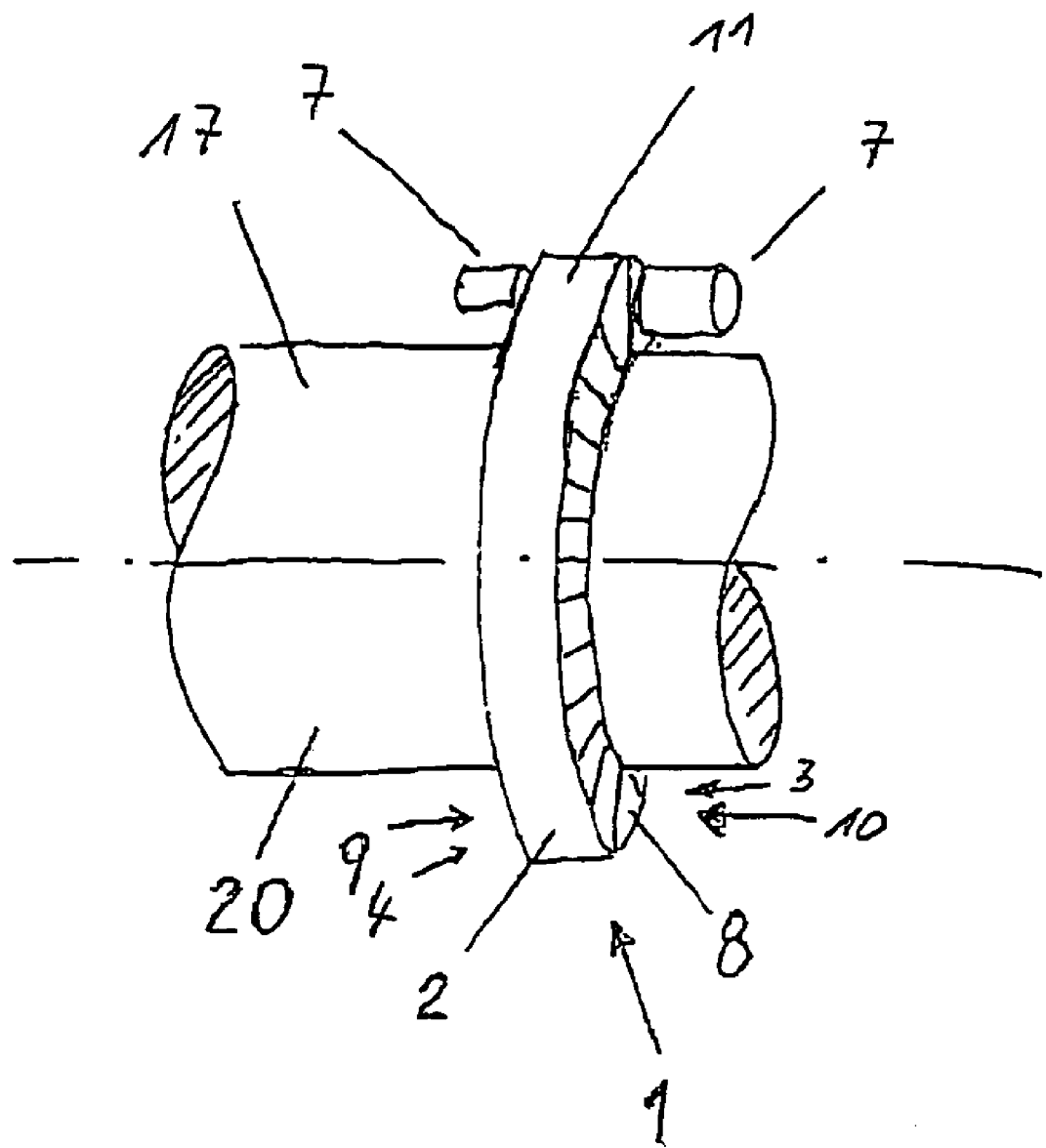
FIG. 2 shows an angle-measurement device with two annular tracers according to a principle of the present invention.

FIG. 2 shows an angle-measurement device 1 consisting of a carrier element 2 formed by a collar 11 of a shaft 20. On carrier element 2, on faces 9 and 10, there is disposed an annular tracer 3 and 4 with coinciding and uniformly distributed, electromagnetically detectable patterns 8. The number of patterns 8 of tracers 3 and 4 differs by one. As a result of this Vernier arrangement, there is only one position with a common transition of the patterns 8 on both tracers 3 and 4. This position is, for example, equal to the UDC marking of a crankshaft 17 of an internal combustion engine. From the phase difference of the signals of patterns 8, the UDC position can be determined at any angle position. Patterns 8 are impressed into tracers 3 and 4 by magnetization. The electromagnetic signals from tracers 3 and 4 are detected by sensors 7.

Figure 3:
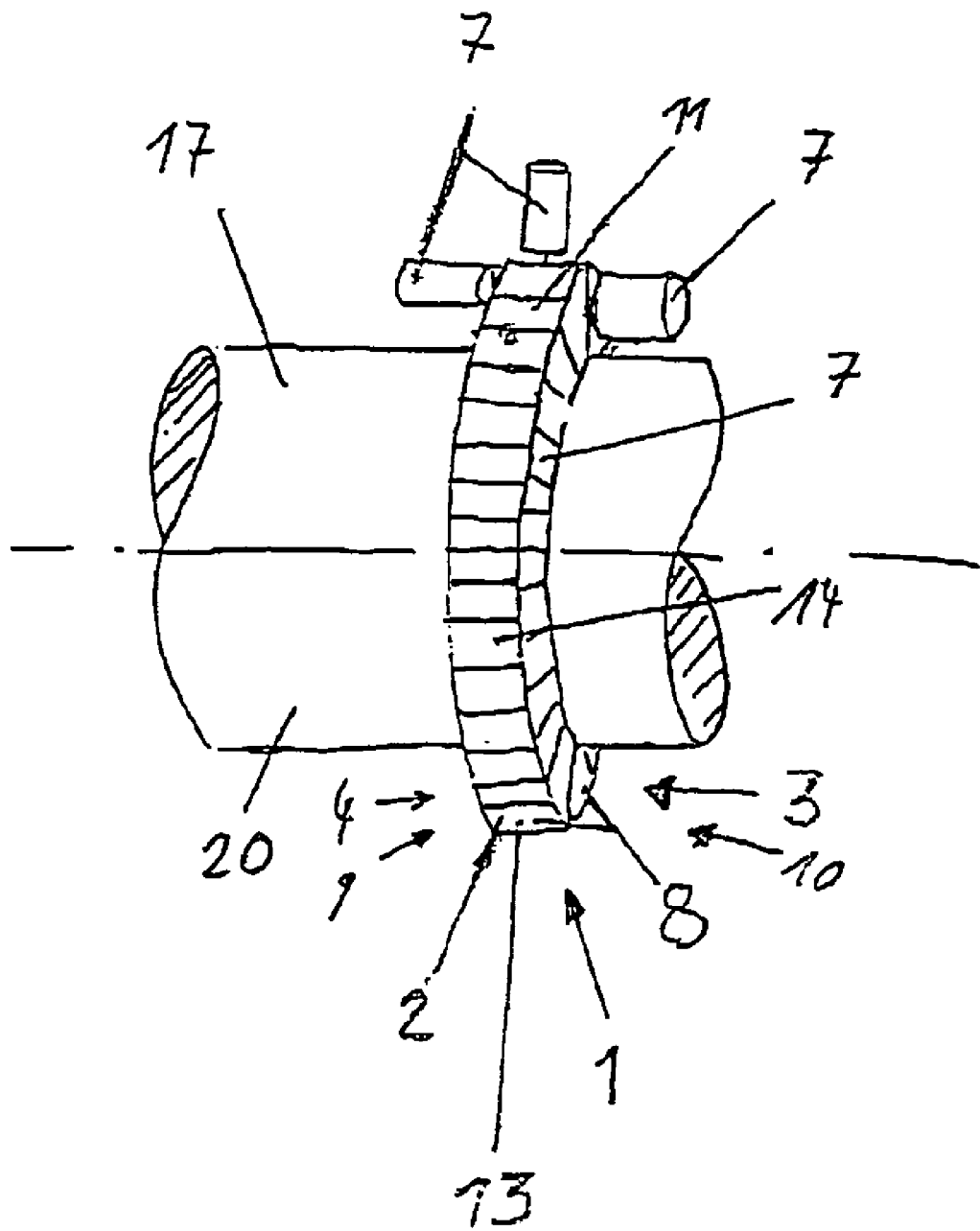
FIG. 3 shows an angle-measurement device with two annular tracers and one cylindrical tracer according to a principle of the present invention.

FIG. 3 shows an angle-measurement device according to FIG. 2 having an additional tracer 14 with electromagnetically detectable patterns 8 disposed on the cylindrical surface 13 of collar 11.

Figure 4:
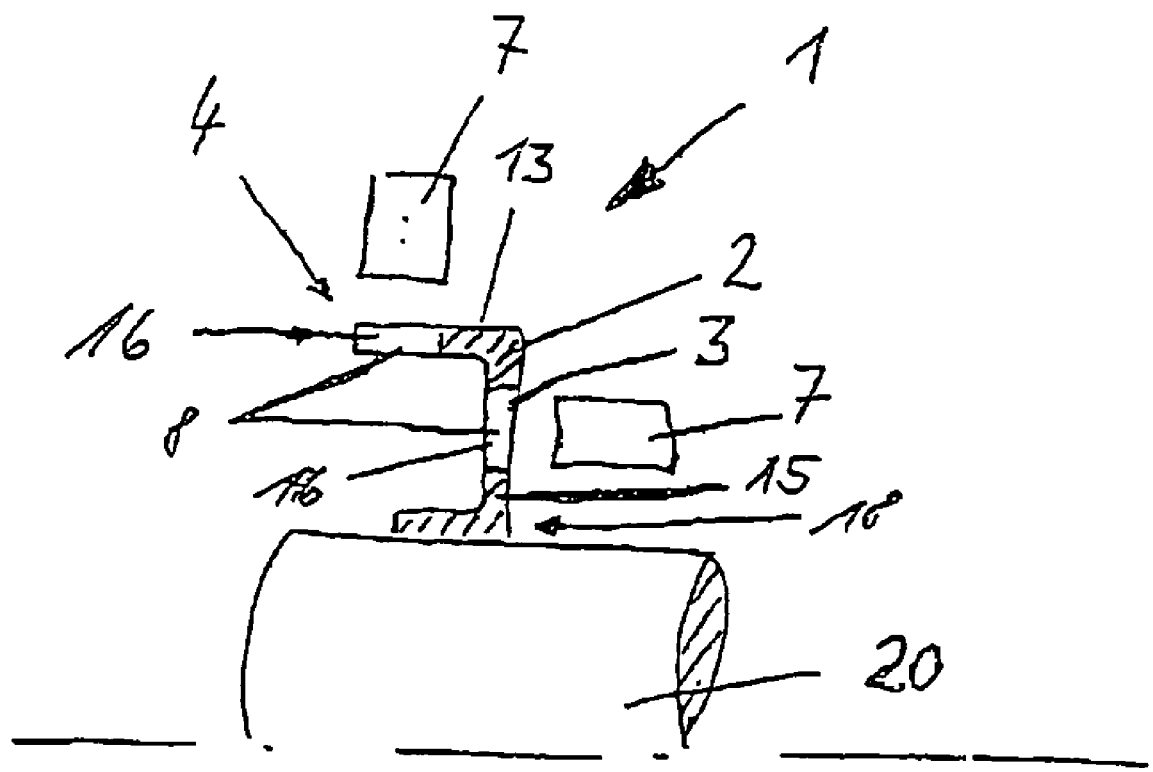
FIG. 4 shows an angle-measurement device with a carrier element made of sheet metal according to a principle of the present invention.

FIG. 4 shows an angle-measurement device 1 with a carrier element 2 made of stamped-out sheet metal 15 that is connected with a shaft 20 in rotation-resistant manner. On one face 18 of carrier element 2 is disposed an annular tracer 3 and on the cylindrical surface 13 is disposed a cylindrical tracer 4. Coinciding patterns 8 are periodically distributed over the two tracers. Patterns 8 consist of recesses 16 and are electromagnetically or optically detectable by sensors 7. The number of patterns 8 of the two tracers 3, 4 differs by one.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An angle-measurement device for a crankshaft of an internal combustion engine, the angle-measurement device comprising:

a carrier element including at least two tracers, at least one tracer being configured as an annular surface of the carrier element, and at least one tracer being configured as a cylindrical surface of the carrier element;

each tracer having essentially coinciding periodic patterns that are electromagnetically or optically detectable by at least one sensor, one tracer having a number N of patterns and the other tracer having a number N+1 of patterns;

wherein a position of the angle-measurement device with a common transition of the patterns of the two tracers is assigned to an upper dead center of the crankshaft.

2. The device according to claim 1, wherein the carrier element consists of a sheet-metal part.

3. The device according to claim 2, wherein the patterns are in the form of recesses, and are formed in the sheet-metal part.

4. The device according to claim 1, wherein the tracers comprise a magnetizable material.

5. The device according to claim 1, wherein the tracers comprise a ferrite-filled plastic material.

6. The device according to claim 1, wherein at least one of the sensors functions on a passive measuring principle.

7. The device according to claim 1, wherein at least one of the sensors functions on an active measuring principle.

8. An angle-measurement device for a crankshaft of an internal combustion engine, the angle-measurement device comprising:

at least two tracers configured as an annular surface, each tracer having essentially coinciding periodic patterns that are detectable electromagnetically or optically by at least one sensor, one tracer having a number N of patterns and the other tracer having a number N+1 of patterns, and one tracer being disposed on one face and the other tracer being disposed on another face of an annular carrier element;

wherein a position of the angle-measurement device with a common transition of the patterns of the two tracers is assigned to an upper dead center of the crankshaft.

9. The device according to claim 8, wherein the carrier element is formed by a collar of a shaft.

10. The device according to claim 8, wherein the two faces of the carrier element are radially connected on an outer circumferential side surface by a cylindrical surface extending in an axial direction, and at least one other tracer is disposed on the cylindrical surface.

11. An angle-measurement device for a cassette seal, the angle-measurement device comprising:
- a carrier element with at least two tracers, at least one tracer being configured as an annular surface and at least one tracer being configured as a cylindrical surface, each tracer having essentially coinciding periodic patterns that are electro-magnetically or optically detectable by at least one sensor;
- wherein one tracer has a number N of patterns and the other tracer has a number N+1 of patterns.

12. An angle-measurement device for a cassette seal, the angle-measurement device comprising:
- at least two tracers configured as an annular surface, each tracer having essentially coinciding periodic patterns that are electromagnetically or optically detectable by at least one sensor, one tracer having a number N of patterns and the other tracer having a number N+1 of patterns;
- wherein one tracer is disposed on one face and the other tracer is disposed on another face of an annular carrier element.

* * * * *